Patented Oct. 25, 1949

2,485,796

UNITED STATES PATENT OFFICE 2,485,796

POLYMERIZATION OF VINYL ESTERS

Jesse O. White, Arlington, N. J., assignor to E. I. du Pont de Nemours & Company, Wilmington, Del., a corporation of Delaware No Drawing. Application January 25, 1946, Serial No. 643,458

6 Claims. (Cl. 260—87.3)

This invention relates to the production of plastic materials by the polymerization of vinyl esters and, more particularly, to the production of granular polymers by the polymerization of vinyl esters.

It has heretofore been proposed to polymerize vinyl esters and other polymerizable compounds by emulsifying such compounds in liquids in which they are substantially insoluble, and subsequently polymerizing them. A later development of this technique is the polymerization of the aforementioned compounds in granular form with the aid of a suitable granulating agent and agitation of the liquid medium. The product obtained by the granular method is much superior to that obtained by the emulsification method, having a higher bulk density and more satisfactory handling properties. The agents heretofore employed to granulate the vinyl polymers, however, are either lyophilic colloids of the type of soluble starch, gum tragacanth, agar agar and the like or polyvinyl acetate in various stages of hydrolysis. The lyophilic colloids vary markedly in dispersive power and moreover must be added to the polymerization mixture before reaction has begun, that is, before appreciable polymerization has occurred. In addition, granular vinyl polymers, such as polyvinyl acetate, for example, made with starch must be lubricated to prevent adhesion of the granules during the removal of water.

Completely or partially hydrolyzed polyvinyl acetate presents certain disadvantages as a granulating agent. Because of its high solubility in water it possesses poor granulating powers and the results obtained to a large extent are not reproducible because the granules produced by this method vary widely in size.

An object of the present invention is the polymerization of vinyl compounds to produce a granular product. A further object is to provide a granulating agent for the production of granular vinyl polymers which may be added to the polymerization mixture without first being put into solution. A still further object is the production of polyvinyl ester granules of uniform size and shape. Another object is the production of free flowing granular polyvinyl esters which require no further coating or lubrication. Other objects will appear from the description of the invention given hereinafter.

The above objects are accomplished according to the present invention by polymerizing polymerizable vinyl compounds dispersed in water and in the presence of a hydrolyzed ethylene/vinyl acetate copolymer as a granulating agent.

More specifically, in the polymerization of vinyl compounds, according to this invention, it is desirable that the granulating agent have from 2% to 8% ethylene after hydrolysis and be used in a proportion of 0.28–0.66 part, by weight, to about 100 parts of the monomer. Also, as those skilled in the art will appreciate, it is usually advantageous to carry out the polymerization in the presence of a catalyst and a buffer.

The following examples illustrate specific embodiments of the invention, all parts being given by weight unless otherwise noted. Examples I to III show the polymerization of ethylene and vinyl acetate to produce a granular ethylene/vinyl acetate copolymer. Example IV and V show the polymerization of vinyl acetate to produce a granular polymer. The product produced, in each example, is a free-flowing granular material, the granules of which are substantially uniform in size and shape with 90% thereof passing a 40-mesh screen and being retained on a 60-mesh screen.

Example I

A reaction kettle equipped with an agitator and jacket for regulating the temperature is charged as follows:

| | Parts |
|---|---|
| Vinyl acetate | 100 |
| Water | 113 |
| Hydrogen peroxide solution. This contains about 30% of active hydrogen peroxide | 0.2 |
| Sodium bicarbonate | 0.1 |
| Completely hydrolyzed ethylene/vinyl acetate copolymer (8% ethylene after hydrolysis) | 0.6 |
| Ethylene | --- |

All of the ingredients are put in the kettle and the ethylene introduced until the pressure inside the kettle reaches 25 lbs. per square inch. The pressure is then released and hot water circulated through the jacket of the kettle. As the temperature increases the ethylene is introduced at such a rate that the pressure inside the kettle is 80 lbs. per square inch and the temperature reaches 70° C. The pressure and temperature are maintained at these values for 2½ hours after which the pressure is released and the residual vinyl acetate monomer removed by distillation. The charge is then cooled and the granular ethylene/vinyl acetate copolymer product separated from the liquid by centrifuging.

Example II

A reaction kettle equipped with an agitator and jacket for regulating the temperature is charged as follows:

| | Parts |
|---|---|
| Vinyl acetate | 100 |
| Water | 113 |
| Hydrogen peroxide solution | 0.14 |
| Sodium bicarbonate | 0.1 |
| Completely hydrolyzed ethylene/vinyl acetate copolymer (8% ethylene after hydrolysis) | 0.28 |
| Ethylene | --- |

Polymerization is carried out according to the procedure given in Example I.

Example III

A reaction kettle equipped with an agitator and jacket for regulating the temperature is charged as follows:

| | Parts |
|---|---|
| Vinyl acetate | 100 |
| Water | 113 |
| Hydrogen peroxide solution | 0.02 |
| Sodium bicarbonate | 0.1 |
| Completely hydrolyzed ethylene/vinyl acetate copolymer (8% ethylene after hydrolysis) | 0.66 |
| Ethylene | --- |

All the ingredients are added to the kettle and the ethylene introduced until the pressure reaches 25 lbs. per square inch. The pressure is released and hot water circulated through the jacket of the kettle. As the temperature inside the kettle increases, pressure is applied by introducing the ethylene at such a rate that a pressure of 100 lbs. per square inch is obtained when the temperature reaches 90° C. The temperature and pressure are maintained at these values for two hours after which the pressure is released and the residual vinyl acetate monomer removed by distillation. The charge is then cooled and the granular ethylene/vinyl acetate copolymer product separated from the liquid by centrifuging.

Example IV

A reaction kettle equipped with an agitator and reflux condenser is charged as follows:

| | Parts |
|---|---|
| Vinyl acetate | 100 |
| Water | 113 |
| Hydrogen peroxide solution | 0.3 |
| Sodium bicarbonate | 0.1 |
| Completely hydrolyzed ethylene/vinyl acetate copolymer (8% ethylene after hydrolysis) | 0.36 |

All of the ingredients are added to the kettle and the resulting charge heated to 66° C. at which temperature reflux begins. The charge is then refluxed gently and the temperature gradually increased as the monomer is converted to polymer. When the temperature reaches 90° C. which requires about 55 minutes, the residual vinyl acetate monomer is removed by distillation. The charge is then cooled and the granular vinyl acetate polymer separated from the liquid by centrifuging.

Example V

A reaction kettle equipped with an agitator and reflux condenser is charged as follows:

| | Parts |
|---|---|
| Vinyl acetate | 100 |
| Water | 113 |
| Hydrogen peroxide solution | 0.3 |
| Sodium bicarbonate | 0.1 |
| Completely hydrolyzed ethylene/vinyl acetate copolymer (80% ethylene after hydrolysis) | 0.32 |

The same reaction procedure as that given under Example I is used; however, 40 minutes after the temperature reaches 66° C. the reaction mixture agglomerated to a thick syrupy mass. In order to disperse the undesirable agglomeration a solution containing 0.428 part of completely hydrolyzed ethylene/vinyl acetate copolymer (8% ethylene after hydrolysis) in 3.714 parts water and 0.371 part ethanol is added immediately. The mass disperses quickly forming particles of polymer. The process was completed as in Example IV.

Although for purposes of illustration the above examples show the polymerization of vinyl acetate and vinyl acetate with ethylene, the invention is by no means limited thereto and may include the polymerization of monomers of vinyl esters, esters of acrylic or methacrylic acid, styrene, vinyl chloride, ethylene, isobutylene and the like, either alone or in combination with each other.

As the granulating agent, either a completely or partially hydrolyzed ethylene/vinyl acetate copolymer is useful for producing granular vinyl polymers according to this invention. Granulating agents consisting of completely or partially hydrolyzed ethylene/vinyl acetate copolymers in a proportion of 0.28 to 0.66 part, by weight, to about 100 parts monomer and having from 2% to 8% ethylene after hydrolysis are useful. Preferably the granulating agent is a completely hydrolyzed ethylene/vinyl acetate copolymer used in the proportion specified above and comprises from 7% to 8% ethylene after hydrolysis. Copolymer granulating agents containing materially more than about 8% ethylene after hydrolysis are more insoluble in water and therefore less effective, and granulating agents containing substantially less than about 2% ethylene after hydrolysis become progressively weaker in granulating tendency as the content of ethylene therein decreases. By adjusting the concentration of granulating agent with respect to the monomer, polymer granules of substantially uniform size and shape may be readily obtained. As the concentration of the granulating agent increases, the size of the granules decreases and approaches emulsification of the polymer.

As is known in the art, catalysts for the reaction may include organic and inorganic peroxides; and buffers may include alkali and alkali metal salts.

The polymerization may be conducted at the reflux temperature of the mixture or may be conducted at higher temperatures by increasing the reaction pressure above atmospheric.

It will be appreciated by those skilled in the art, that the size of the granules is to a certain degree dependent on the agitation speed, reaction time, and the concentration of the catalyst; and that the agitation speed is related somewhat to the viscosity and effectiveness of the granulating agent. However, these relationships are substantially the same in the present invention as in the prior art.

An advantage of the present invention is that it provides an improved method for the granular polymerization of vinyl compounds. A further advantage of this invention is that it provides a process for producing granular vinyl polymers, the granules of which are unusually uniform in size and shape. Such uniformity is of great value in commercial operations such as centrifuging, drying, and dissolving the polymer. A still further advantage is the removal of the step wherein the granulating agent is put into solution prior to being added to the polymerization mixture. The low solubility in water of this granulating agent makes possible its preparation and use in a dry solid state. Another advantage is that the granulating agent may be added to the polymerization mixture after appreciable polymerization has occurred, Example V being an instance in which this procedure is followed. Example V also might well have illustrated the preceding advantage, but it was found best under these particular circumstances to add the granulating agent in the form of a solution to the polymerization mixture. Another advantage is that because of the low solubility in water of the granulating agent less of it need be used to produce granules of a given average size than would be necessary with a more soluble granulating agent, for example, hydrolyzed polyvinyl acetate. An additional advantage is that the hydrolyzed ethylene/vinyl acetate copolymers serve not only as a granulating agent but also as a lubricant for the granular particles.

As many apparently widely different embodiments of this invention may be made without departing from the spirit and scope thereof, it is to be understood that the invention is not limited to the specific embodiments thereof except as defined in the appended claims.

I claim:
1. Process of polymerizing ethylene and vinyl acetate to produce a granular ethylene/vinyl acetate copolymer which process comprises dispersing vinyl acetate in an aqueous medium, adding a completely hydrolyzed ethylene/vinyl acetate copolymer thereto in a proportion of 0.28–0.66 part, by weight, to 100 parts of vinyl acetate, said hydrolyzed copolymer having from 2% to 8% ethylene after hydrolysis, adding ethylene thereto, and polymerizing said ethylene and vinyl acetate.

2. Process of polymerizing ethylene and vinyl acetate to produce a granular ethylene/vinyl acetate copolymer which process comprises dispersing vinyl acetate in an aqueous medium, adding a completely hydrolyzed ethylene/vinyl acetate copolymer thereto in a proporiton of 0.28–0.66 part, by weight, to 100 parts of vinyl acetate, said hydrolyzed copolymer having from 7% to 8% ethylene after hydrolysis, adding ethylene thereto and polymerizing said ethylene and vinyl acetate.

3. Process of polymerizing vinyl acetate to produce a granular product which process comprises dispersing vinyl acetate in an aqueous medium, adding a completely hydrolyzed ethylene/vinyl acetate copolymer thereto in a proportion of 0.28–0.66 part, by weight, to 100 parts of vinyl acetate, said hydrolyzed copolymer having from 2% to 8% ethylene after hydrolysis, and polymerizing said vinyl acetate.

4. Process of polymerizing vinyl acetate to produce a granular product which process comprises dispersing vinyl acetate in an aqueous medium, adding a completely hydrolyzed ethylene/vinyl acetate copolymer thereto in a proportion of 0.28–0.66 part, by weight, to 100 parts of vinyl acetate, said hydrolyzed copolymer having from 7% to 8% ethylene after hydrolysis, and polymerizing said vinyl acetate.

5. A process of polymerizing vinyl compounds to produce a granular product which comprises dispersing the said vinyl compound in an aqueous medium; adding thereto in a proportion of 0.28–0.66 part, by weight, to 100 parts of the said dispersed vinyl compound a completely hydrolyzed ethylene/vinyl acetate copolymer, the said hydrolyzed copolymer having 2%–8% ethylene after hydrolysis; adding ethylene thereto and polymerizing the said vinyl compound.

6. A process of polymerizing vinyl compounds to produce a granular product which comprises dispersing the said vinyl compound in an aqueous medium; adding thereto in a proportion of 0.28–0.66 part, by weight, to 100 parts of the said dispersed vinyl compound a completely hydrolyzed ethylene/vinyl acetate copolymer, the said hydrolyzed copolymer having 2%–8% ethylene after hydrolysis; and polymerizing the said vinyl compound.

JESSE O. WHITE.

REFERENCES CITED

The following references are of record in the file of this patent:

UNITED STATES PATENTS

| Number | Name | Date |
| --- | --- | --- |
| 2,279,436 | Berg | Apr. 14, 1942 |
| 2,386,347 | Roland | Oct. 9, 1945 |
| 2,397,866 | McQueen | Apr. 2, 1946 |

Certificate of Correction

Patent No. 2,485,796                                                              October 25, 1949

JESSE O. WHITE

It is hereby certified that errors appear in the printed specification of the above numbered patent requiring correction as follows:

Column 4, line 5, for "80%" read *8%*; line 10, for "reaches" read *reached*; column 5, line 54, for "proporiton" read *proportion*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*